United States Patent
Ushiyama et al.

(10) Patent No.: US 8,247,021 B2
(45) Date of Patent: *Aug. 21, 2012

(54) LIQUID MATERIAL ARRANGEMENT METHOD, COLOR FILTER MANUFACTURING METHOD, AND ORGANIC EL DISPLAY DEVICE MANUFACTURING METHOD

(75) Inventors: Yoshihiko Ushiyama, Nagano (JP); Tsuyoshi Kitahara, Nagano (JP); Yoichi Miyasaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1045 days.

This patent is subject to a terminal disclaimer.

(21) Appl. No.: 11/835,166

(22) Filed: Aug. 7, 2007

(65) Prior Publication Data

US 2008/0291229 A1 Nov. 27, 2008

(30) Foreign Application Priority Data

Aug. 11, 2006 (JP) .................................. 2006-220015

(51) Int. Cl.
- B05D 5/06 (2006.01)
- B05D 5/12 (2006.01)
- G06F 3/038 (2006.01)
- G09G 5/00 (2006.01)
- B41J 29/38 (2006.01)
- B41J 2/17 (2006.01)

(52) U.S. Cl. ................. 427/66; 345/204; 347/9; 347/12; 347/95

(58) Field of Classification Search ................. 427/8
See application file for complete search history.

(56) References Cited

U.S. PATENT DOCUMENTS

| 6,707,579 | B1 | 3/2004 | Komiya et al. |
| 7,015,503 | B2 | 3/2006 | Seki et al. |
| 2002/0044163 | A1* | 4/2002 | Shigemura ................. 347/1 |
| 2002/0070990 | A1* | 6/2002 | Yamasaki et al. ............ 347/15 |
| 2003/0076609 | A1* | 4/2003 | Kawase .................. 359/885 |
| 2005/0083364 | A1* | 4/2005 | Billow ................... 347/19 |

FOREIGN PATENT DOCUMENTS

| JP | 2001-194519 A | 7/2001 |
| JP | 2002-148422 A | 5/2002 |
| JP | 2003-159787 A | 6/2003 |
| WO | WO 99/48339 A1 | 9/1999 |

* cited by examiner

Primary Examiner — Nathan Empie
Assistant Examiner — Austin Murata
(74) Attorney, Agent, or Firm — Global IP Counselors, LLP

(57) ABSTRACT

A liquid material arrangement method includes performing a first pattern generating step, a dot deleting step, and a liquid material arranging step. The first pattern generating step includes generating a first dot pattern in which a first prescribed number of dots is set according to the prescribed region. The dot deleting step includes deleting a second prescribed number of dots from the first prescribed number of dots to generate a second dot pattern. The liquid material arranging step includes arranging a liquid material in a prescribed region on a substrate by causing a nozzle and the substrate to scan in relative manner and discharging the liquid material from the nozzle based on the second dot pattern. The performing of the dot deleting step further includes deleting at least one prohibited dot with priority with the prohibited dot being determined based on discharge information of the nozzle determined in advance.

19 Claims, 15 Drawing Sheets

PROHIBITED DOT DETERMINATION TABLE

| DETERMINATION CONDITION 1 | DETERMINATION CONDITION 2 |
|---|---|
| Dots Corresponding To Abnormally Discharging Nozzles | — |
| Precision Of Arrangement Position In The Primary Scanning Direction: Dots Corresponding To Nozzles In Which Δ1 Is Less Than Prescribed Quantity | First Adjacent Dots Of Imaginary Boundary On The Primary Scanning Direction Side |
| Precision Of Arrangement Position In The Primary Scanning Direction: Dots Corresponding To Nozzles In Which Δ1 Is Equal To Or Greater Than The Prescribed Quantity | First And Second Adjacent Dots Of The Imaginary Boundary On The Deviation Direction Side |
| Precision Of Arrangement Position In The Secondary Scanning Direction: Dots Corresponding To Nozzles In Which Δ2 Is Equal To Or Greater Than The Prescribed Quantity | First Adjacent Dots Of The Imaginary Boundary On The Deviation Direction Side |

FIG. 11

TABLE OF SELECTION CONDITIONS FOR
DELETED DOTS IN S15

| PRIORITY ORDER | SELECTION CONDITIONS |
|---|---|
| 1 | Dots Of The Third Scan |
| 2 | Dots That Are More Distant From The Imaginary Boundary On The Secondary Scanning Direction Side |
| 3 | Dots That Are More Distant From The Imaginary Boundary On The Primary Scanning Direction Side |

FIG. 12

TABLE OF SELECTION CONDITIONS FOR DELETED DOTS IN S15

| PRIORITY ORDER | SELECTION CONDITIONS |
|---|---|
| 1 | DOTS CORRESPONDING TO NOZZLES OTHER THAN THE NOZZLES THAT CORRESPOND TO DOTS ALREADY DELETED IN S15 |
| 2 | DOTS THAT ARE MORE DISTANT FROM THE IMAGINARY BOUNDARY ON THE SECONDARY SCANNING DIRECTION SIDE |
| 3 | DOTS THAT ARE MORE DISTANT FROM THE IMAGINARY BOUNDARY ON THE PRIMARY SCANNING DIRECTION SIDE |

FIG. 15

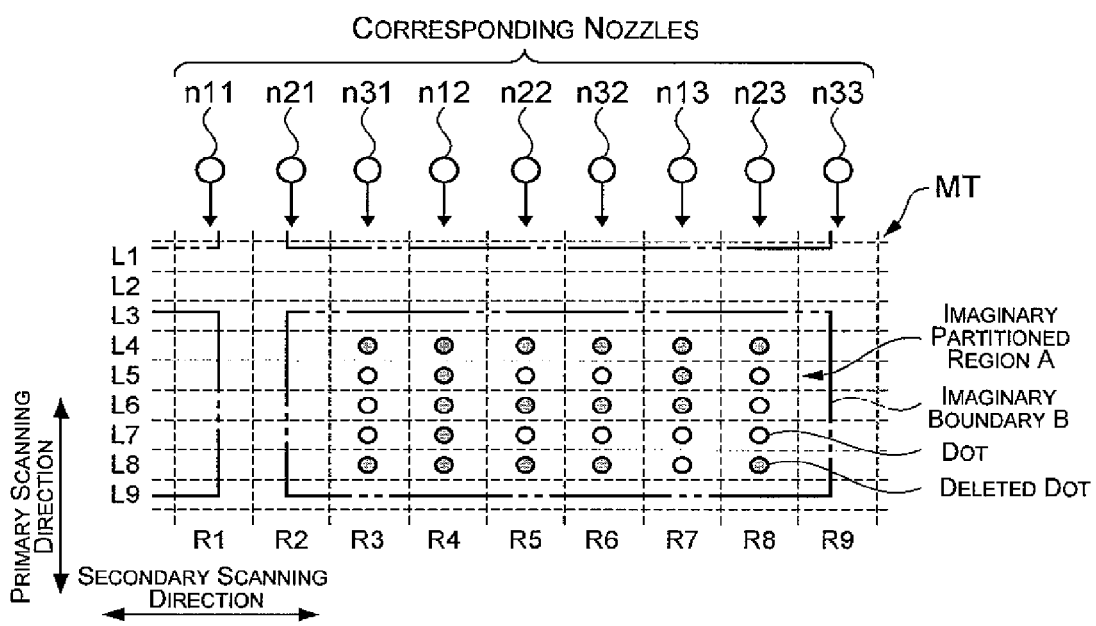

FIG. 16

TABLE OF SELECTION CONDITIONS FOR
DELETED DOTS IN S15

| PRIORITY ORDER | SELECTION CONDITIONS |
|---|---|
| 1 | DOTS CORRESPONDING TO NOZZLES OTHER THAN THE NOZZLES THAT CORRESPOND TO DOTS ALREADY DELETED IN S15 |
| 2 | DOTS OF THE THIRD SCAN |
| 3 | DOTS THAT ARE CLOSER TO THE IMAGINARY BOUNDARY ON THE SECONDARY SCANNING DIRECTION SIDE |
| 4 | DOTS THAT ARE CLOSER TO THE IMAGINARY BOUNDARY ON THE PRIMARY SCANNING DIRECTION SIDE |

FIG. 17

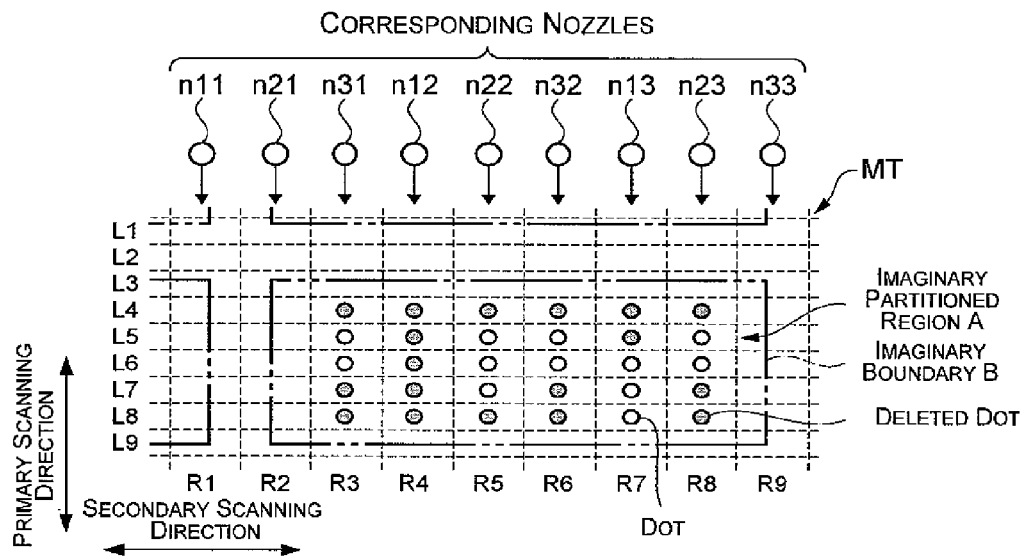

FIG. 18

LIQUID MATERIAL ARRANGEMENT METHOD, COLOR FILTER MANUFACTURING METHOD, AND ORGANIC EL DISPLAY DEVICE MANUFACTURING METHOD

CROSS-REFERENCE TO RELATED APPLICATIONS

This application claims priority to Japanese Patent Application No. 2006-220015 filed on Aug. 11, 2006. The entire disclosure of Japanese Patent Application No. 2006-220015 is hereby incorporated herein by reference.

BACKGROUND OF THE INVENTION

1. Technical Field

The present invention relates to a liquid material arrangement method that uses a liquid droplet discharge method, and to a method for manufacturing a color filter and a method for manufacturing an organic EL display device that use the liquid material arrangement method.

2. Related Art

Coating techniques that use a droplet discharge method have recently received attention. For example, Japanese Laid-Open Patent Application Publication No. 2003-159787 discloses a method for manufacturing a color filter for a liquid crystal display device using a droplet discharge method. In this manufacturing method, a liquid material (droplets) that includes a color material is discharged from micro nozzles in a droplet discharge head (hereinafter referred to as a head) that scans in relation to a substrate, the liquid material is arranged (drawn) in partitioned regions on the substrate and then cured by drying the arranged liquid material, and a color film that corresponds to a pixel is formed.

The pattern in which the droplets are arranged on the substrate can be expressed as a so-called dot pattern (dot matrix pattern), and the dot pattern is converted to ON/OFF data (discharge data) for discharge that correspond to the relative positions (hereinafter referred to as scanning positions) of each nozzle with respect to the substrate, and discharge is controlled. Such a dot pattern is generated in advance according to a liquid material pattern to be formed on the substrate (in accordance with a corresponding pixel structure in the case of color filter manufacturing), or a nozzle (head) alignment configuration or other hardware conditions.

However, the nozzle (head) characteristics can vary from unit to unit, and the characteristics sometimes vary due to late-occurring factors and other causes, and the hardware conditions sometimes do not necessarily match the ideal model. A dot pattern must be newly generated in accordance with various hardware conditions in order to arrange the liquid material with high precision. For example, when a severe error occurs in the amount of discharge from a certain nozzle, a dot pattern may be generated that does not use the affected nozzle, or a dot pattern may be generated in which the landing positions are corrected according to the landing alignment of the droplets.

However, it is extremely inefficient to generate a new dot pattern for each case such as the various cases described above. The reason for this is that an appropriate dot arrangement must be created for each condition while taking into account the number of dots to be arranged in the partitioned region, the scanning position of each nozzle for each scan, the frequency with which each nozzle is used, and other factors.

In view of the above, it will be apparent to those skilled in the art from this disclosure that there exists a need for an improved liquid material arrangement method. This invention addresses this need in the art as well as other needs, which will become apparent to those skilled in the art from this disclosure.

SUMMARY

The present invention was developed in order to overcome the problems described above, and an advantage of the present invention is to provide a liquid material arrangement method capable of adapting to a wide variety of conditions through simple processing to arrange a liquid material, and to provide a color filter manufacturing method and an organic EL display device manufacturing method that use the liquid material arrangement method.

According to one aspect of the present invention, a liquid material arrangement method is performed for arranging a liquid material in a prescribed region on a substrate by causing a nozzle and the substrate to scan in relative manner and discharging the liquid material from the nozzle based on a dot pattern. The liquid material arrangement method comprises a first pattern generating step for generating a first dot pattern in which a first prescribed number of dots is set according to the prescribed region, a dot deleting step for deleting a second prescribed number of dots from the first prescribed number of dots to generate a second dot pattern, and a liquid material arranging step for arranging the liquid material based on the second dot pattern, wherein prohibited dots determined based on discharge information of the nozzle known or determined in advance are deleted with priority in the dot deleting step.

In the liquid material arrangement method of one aspect of the present invention, a second prescribed number of dots are deleted from a first dot pattern that has the first prescribed number of dots set so as to correspond to a prescribed region, a second dot pattern is generated, and the liquid material is arranged based on the second dot pattern. A determination is then made as to whether any of the abovementioned first prescribed number of dots are prohibited dots based on discharge information of the nozzles, dots that are determined to be prohibited dots are deleted with priority, and the second dot pattern is generated. The liquid material can therefore be arranged without performing liquid material discharge that is likely to cause defects. Since the second dot pattern is generated essentially by "selecting" dots for deletion from the plurality (first prescribed number) of dots under given conditions (discharge information), processing is simple even under complex conditions. The total number of deleted dots is designated as the second prescribed number, whereby the amount of the liquid material with respect to the prescribed region can easily be kept constant.

The liquid material arrangement method of one aspect of the present invention is preferably includes a discharge information acquiring step for acquiring discharge information of the nozzles that corresponds to at least the first prescribed number of dots, wherein the discharge information acquiring step and the dot deleting step are performed in corresponding fashion for one unit or a plurality of units of the substrate. Thus, the liquid material arrangement method of one aspect of the present invention enables a rapid response to changes in the nozzle discharge information, and enables the liquid material to be arranged under the proper conditions.

The liquid material arrangement method of one aspect of the present invention is preferably arranged such that the prescribed region is partitioned by a bank. Accordingly, it is possible to appropriately prevent the liquid material from occurring outside the prescribed region.

The liquid material arrangement method of one aspect of the present invention is arranged such that at least the accuracy of the arrangement position of the liquid material is acquired in the discharge information acquiring step, and dots that correspond to arrangement positions in which there is risk of the liquid material occurring outside of the prescribed region are deleted with priority as the prohibited dots in the dot deleting step.

According to the liquid material arrangement method of one aspect of the present invention, since dots that correspond to arrangement positions in which there is risk of the liquid material occurring outside of the prescribed region are deleted with priority, the liquid material can be appropriately prevented from occurring outside the prescribed region.

The liquid material arrangement method of the one aspect of the present invention preferably includes a plurality of the nozzles for scanning of the prescribed region, and is arranged such that at least the presence of discharge anomalies is acquired in the discharge information acquiring step, and dots that correspond to the nozzles in which there is a discharge anomaly are deleted with priority as prohibited dots in the dot deleting step.

According to the liquid material arrangement method of one aspect of the present invention, since dots that correspond to the nozzles in which there is a discharge anomaly are deleted with priority, it is possible to prevent a reduction in precision relating to the amount or arrangement position of the liquid material that causes discharge anomalies.

According to another aspect of the present invention, a liquid material arrangement method is performed for arranging a liquid material in a prescribed region on a substrate by causing a nozzle and the substrate to scan in relative manner and discharging the liquid material from the nozzle based on a dot pattern. The liquid material arrangement method of one aspect of the present invention includes a first pattern generating step for generating a first dot pattern in which a first prescribed number of dots is set according to the prescribed region, a prohibited nozzle specifying step for specifying prohibited nozzles whose use is prohibited among the plurality of nozzles, a dot deleting step for deleting a second prescribed number of dots from the first prescribed number of dots to generate a second dot pattern, and a liquid material arranging step for arranging the liquid material based on the second dot pattern, wherein dots that correspond to the prohibited nozzles are deleted with priority in the dot deleting step.

In the liquid material arrangement method of one aspect of the present invention, a second prescribed number of dots are deleted from the first dot pattern that has a first prescribed number of dots set according to the shape and size of the prescribed region, a second dot pattern is generated, and the liquid material is arranged based on the second dot pattern. Dots that correspond to prohibited nozzles that are specified in advance are deleted with priority from the abovementioned first prescribed number of dots to generate the second dot pattern. The liquid material can therefore be arranged without using the prohibited nozzles. Since the second dot pattern is generated essentially by "selecting" dots for deletion from the plurality (first prescribed number) of dots under given conditions (specification of prohibited nozzles), processing is simple even under complex conditions. The total number of deleted dots is designated as the second prescribed number, whereby the amount of the liquid material with respect to the prescribed region can easily be kept constant.

In the liquid material arrangement method for dividing the arrangement of the liquid material with respect to the prescribed region into a plurality of scans, the liquid material arrangement method is arranged such that dots in the final scan of the plurality of scans are deleted with priority in the dot deleting step when the prohibited dots are not included in the first prescribed number of dots, or when the number of the prohibited dots included in the first prescribed number of dots is less than the second prescribed number.

In the liquid material arrangement method of one aspect of the present invention, dots in the final scan are deleted with priority, and the amount of the liquid material arranged in the prescribed region in the final scan is relatively reduced. In the final scan, since the liquid material is discharged in locations in which a certain amount of the liquid material has already been discharged in previous scans, the liquid material can easily escape (overflow) from the prescribed region, but such a problem can be prevented by reducing the amount of the liquid material that is arranged in the final scan.

In the liquid material arrangement method for arranging the liquid material in the prescribed region using a plurality of the nozzles, the liquid material arrangement method is arranged such that dots are deleted so that dots corresponding to each of the plurality of nozzles remain in substantially equal ratios in the dot deleting step when the prohibited dots are not included in the first prescribed number of dots, or when the number of the prohibited dots included in the first prescribed number of dots is less than the second prescribed number.

According to the liquid material arrangement method of the present invention, since dots corresponding to each of the plurality of nozzles are deleted in substantially uniform ratios, the usage frequency of the nozzles is appropriately distributed. This configuration makes it possible to prevent fluctuation in the amount of the liquid material among prescribed regions that is caused by fluctuation in the discharged amount between nozzles.

The liquid material arrangement method of one aspect of the present invention is arranged such that dots that correspond to arrangement positions that are closer to the boundary of the prescribed region are deleted with priority in the dot deleting step when the prohibited dots are not included in the first prescribed number of dots, or when the number of the prohibited dots included in the first prescribed number of dots is less than the second prescribed number.

According to the liquid material arrangement method of one aspect of the present invention, since dots that correspond to arrangement positions that are closer to the boundary of the prescribed region are deleted with priority, the liquid material can be appropriately prevented from occurring outside the prescribed region.

The liquid material arrangement method of one aspect of the present invention is arranged such that dots that correspond to arrangement positions that are farther from the boundary of the prescribed region are deleted with priority in the dot deleting step when the prohibited dots are not included in the first prescribed number of dots, or when the number of the prohibited dots included in the first prescribed number of dots is less than the second prescribed number.

In the liquid material arrangement method of one aspect of the present invention, dots that correspond to arrangement positions that are farther from the boundary of the prescribed region are deleted with priority. Gaps in the wetting by the liquid material can easily occur in arrangement positions that correspond to deleted dots, but such gaps are towards the center of the prescribed region, and are therefore relatively easy to prevent.

The color filter manufacturing method of one aspect of the present invention includes a step for using the liquid material arrangement method to arrange the liquid material including a color material in each of a plurality of the prescribed regions set on the substrate, and a step for curing the arranged liquid material to form colored parts in which the plurality of regions each corresponds to a pixel region.

According to the color filter manufacturing method of the present invention, since the colored parts are formed using the abovementioned liquid material arrangement method, a high-quality color filter can be manufactured by a simple process.

The organic EL display device manufacturing method of one aspect of the present invention includes a step for using the liquid material arrangement method to arrange the liquid material including an organic EL material in each of a plurality of the prescribed regions set on the substrate, and a step for curing the arranged liquid material to form luminescent elements in which the plurality of regions each corresponds to a pixel region.

According to the organic EL display device manufacturing method of the present invention, since the luminescent elements are formed using the above-mentioned liquid material arrangement method, a high-quality organic EL display device can be manufactured by a simple process.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 11 is a diagram showing the conditions for determining prohibited dots;

FIG. 12 is a diagram showing the conditions for selecting deleted dots;

FIG. 15 is a diagram showing the conditions for selecting deleted dots according to Modification Example 1;

FIG. 16 is a diagram showing an example of the second dot pattern according to Modification Example 1;

FIG. 17 is a diagram showing the conditions for selecting deleted dots according to Modification Example 2;

FIG. 18 is a diagram showing an example of the second dot pattern according to Modification Example 2;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Structure of Color Filter

Figure 1:
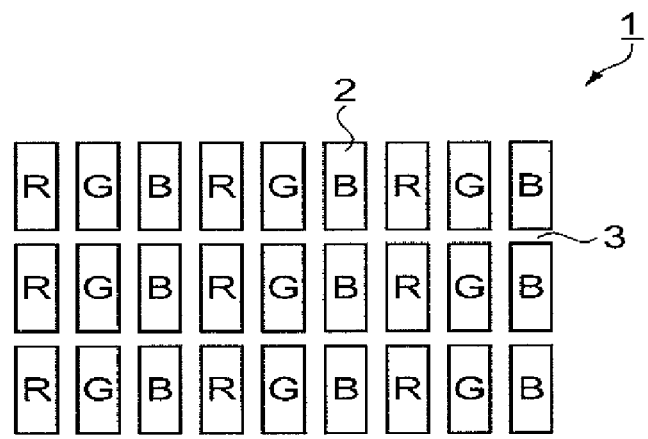
FIG. 1 is a plan view showing the configuration of the color filter.
Figure 2:
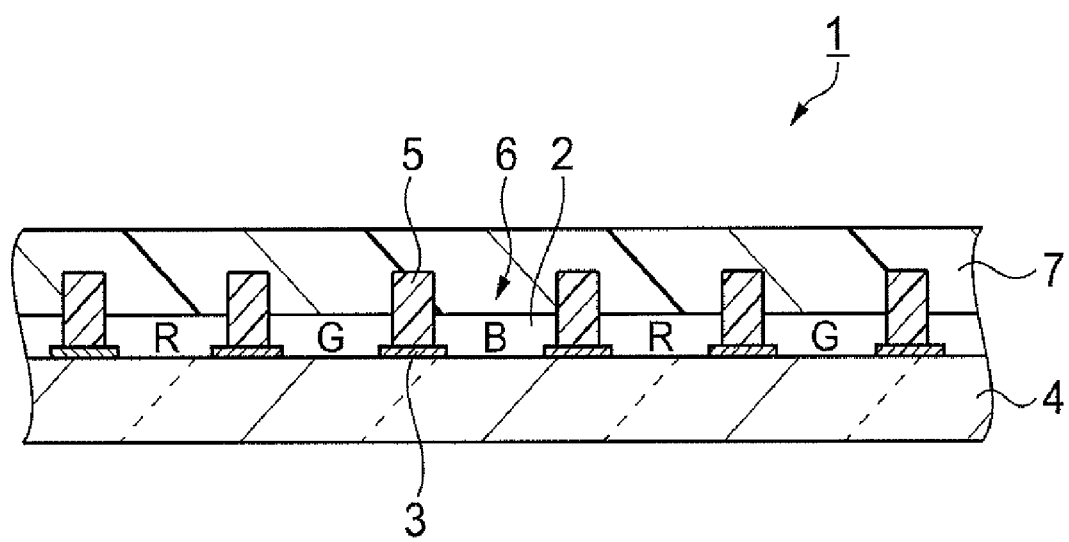
FIG. 2 is a sectional view showing the structure of the color filter.

The structure of the color filter according to the present invention will first be described with reference to FIGS. 1 and 2. FIG. 1 is a plan view showing the configuration of the color filter. FIG. 2 is a sectional view showing the structure of the color filter.

The color filter 1 shown in FIGS. 1 and 2 is used in a color display panel, and has colored parts 2 that are formed so as to correspond to pixels of each color that include R (red), G (green), and B (blue) in the display panel; and light-blocking parts 3 that are formed in the regions between the colored parts 2. The colored parts 2 in the present embodiment have an arrangement and shape that correspond to a so-called striped pixel structure, but a different pixel structure may also be used. For example, a configuration may be adopted that is adapted to a structure that includes a color element other than R, G, and B, or to a delta structure.

The color filter 1 is provided with a glass transparent substrate 4, the light-blocking parts 3 are formed in a pattern on the substrate 4 by chromium or another opaque material, and banks 5 are formed in a pattern on the light-blocking parts 3 using a photosensitive resin or the like. The colored parts 2 are formed within partitioned regions 6 that are partitioned by the banks 5, and an overcoat layer 7 for forming a flat surface is formed by a resin or the like on the surface on which the colored parts 2 are formed.

Mechanical Structure of Liquid Material Discharge Device

The mechanical structure of the liquid material discharge device that uses the liquid material arrangement method of the present invention will next be described with reference to FIGS. 3 and 4.

Figure 3:
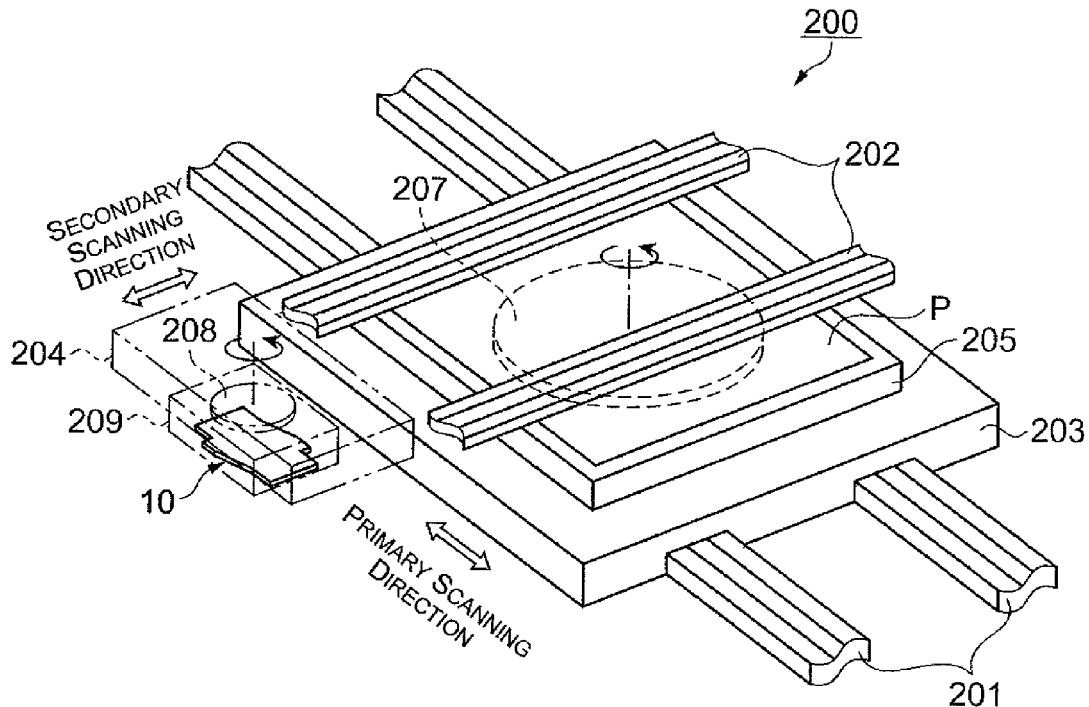
FIG. 3 is a perspective view showing the relevant parts of the liquid material discharge device.

FIG. 3 is a perspective view showing the relevant parts of the liquid material discharge device. FIG. 4 is a plan view showing the layout of the head in the head unit.

The liquid material discharge device 200 shown in FIG. 3 is provided with a pair of guide rails 201 provided linearly, and a primary scanning stage 203 for moving in the primary scanning direction through the use of an air slider and a linear motor (not shown) provided inside the guide rails 201. A pair of guide rails 202 provided linearly so as to be orthogonal to the guide rails 201 is provided above the guide rails 201, and a secondary scanning stage 204 is provided for moving along the secondary scanning direction through the use of an air slider and a linear motor (not shown) provided inside the guide rails 202.

A stage 205 for mounting a substrate P as the discharge object is provided on the primary scanning stage 203. The stage 205 is configured so as to be capable of attaching and fixing the substrate P, and a reference axis in the substrate P can be properly aligned with the primary scanning direction and the secondary scanning direction through the use of a rotation mechanism 207.

The secondary scanning stage 204 is provided with a carriage 209 that is attached by suspension via a rotation mechanism 208. The carriage 209 is provided with a head unit 10 that is provided with a plurality of heads 11, 12 (see FIG. 4); a liquid material feeding mechanism (not shown) for supplying the liquid material to the heads 11, 12; and a control circuit board 211 (see FIG. 5) for electrically controlling the driving of the heads 11, 12.

Figure 4:
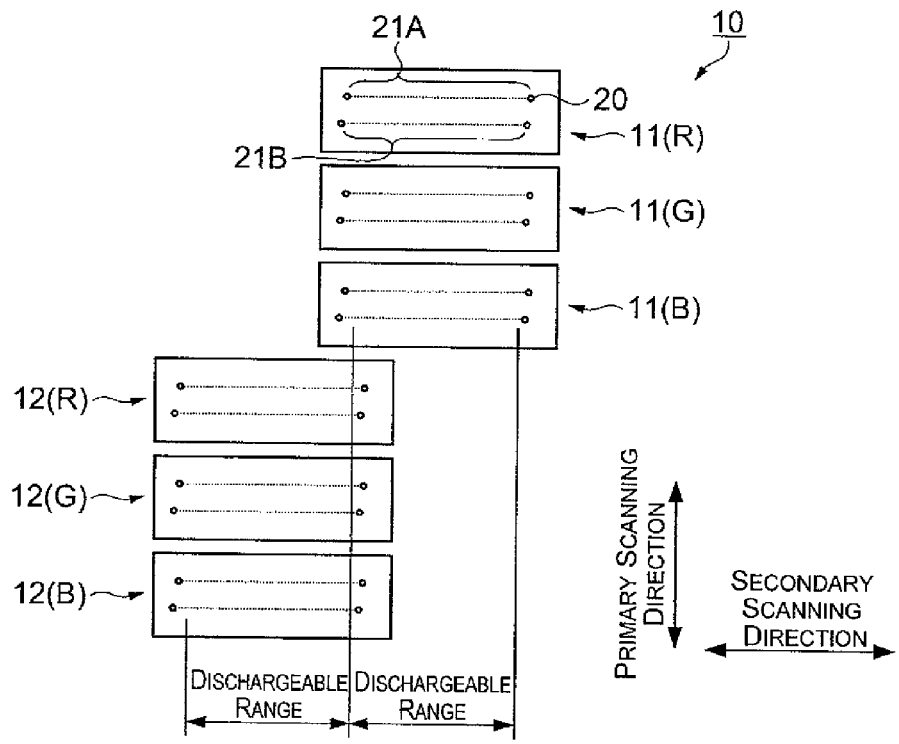
FIG. 4 is a plan view showing the layout of the head in the head unit.

As shown in FIG. 4, the head unit 10 is provided with the heads 11, 12 for discharging the liquid material that corresponds to R, G, and B from the nozzles 20, and the plurality of nozzles 20 in the heads 11, 12 is composed of nozzle groups 21A, 21B. The nozzle groups 21A, 21B each form lines at a prescribed pitch (180 DPI, for example), and are in a staggered relationship to each other. The arrangement direction of the nozzle groups 21A, 21B coincides with the secondary scanning direction.

Figure 6:
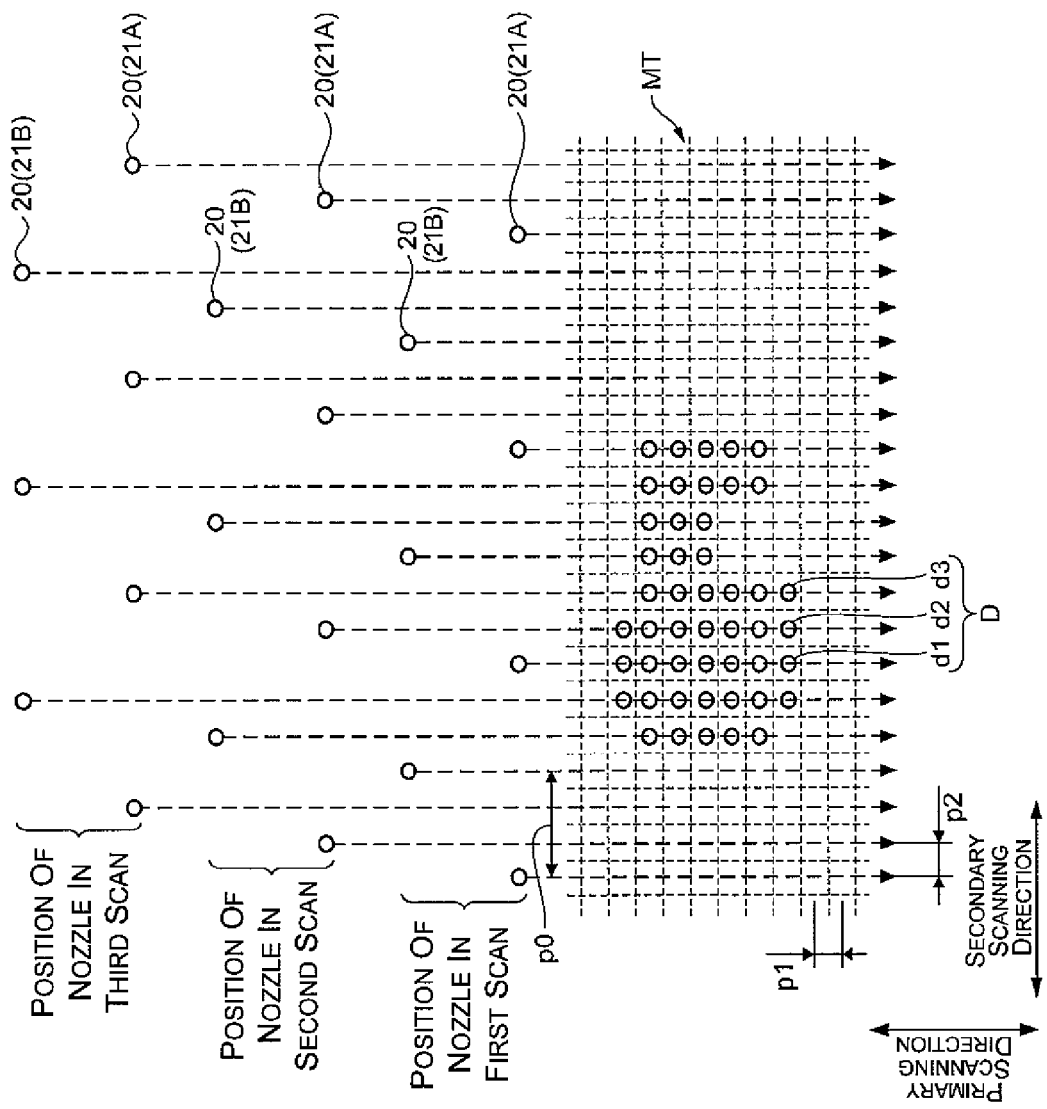
FIG. 6 is a diagram showing the relationship between the dot pattern and the arrangement of the nozzles.

Liquid chambers (cavities) communicated with the nozzles 20 in the heads 11, 12 are configured so that the volume thereof is varied by the driving of piezoelectric elements 16 (see FIG. 6). The liquid material (droplets) can be discharged from the nozzles 20 by supplying electric signals (drive signals) from the piezoelectric elements 16 to control the liquid pressure inside the cavities.

The nozzle groups 21A, 21B scan in the primary scanning direction with respect to the substrate P through the movement of the primary scanning stage 203, and ON/OFF control (hereinafter referred to as discharge control) of discharge for each nozzle 20 is performed, whereby the liquid material can be arranged on the substrate P in positions along the scanning trajectory of the nozzles 20. The heads 11 and the heads 12 are offset from each other in the secondary scanning direction, and the nozzle groups 21A, 21B thereof are configured so as to complement the dischargeable ranges of each other and trace a continuous scanning trajectory at a constant pitch. Several nozzles 20 at the ends of the nozzle groups 21A, 21B are unused out of consideration for the specificity of the characteristics thereof.

The configuration of the liquid material discharge device is not limited by the embodiment described above. For example, a configuration may be adopted in which the arrangement direction of the nozzle groups 21A, 21B is tilted in relation to the secondary scanning direction, and the pitch of the scanning trajectory of the nozzles 20 is narrower than the pitch between the nozzles 20 in the nozzle groups 21A, 21B. The number or arrangement of the heads 11, 12 in the head unit 10 may also be appropriately varied. A so-called thermal scheme in which heating elements are provided to the cavities, for example, or another scheme may be employed as the drive scheme of the heads 11, 12.

Discharge Control Method

The method for controlling discharge in the liquid material discharge device will next be described with reference to FIGS. 5 and 6.

Figure 5:
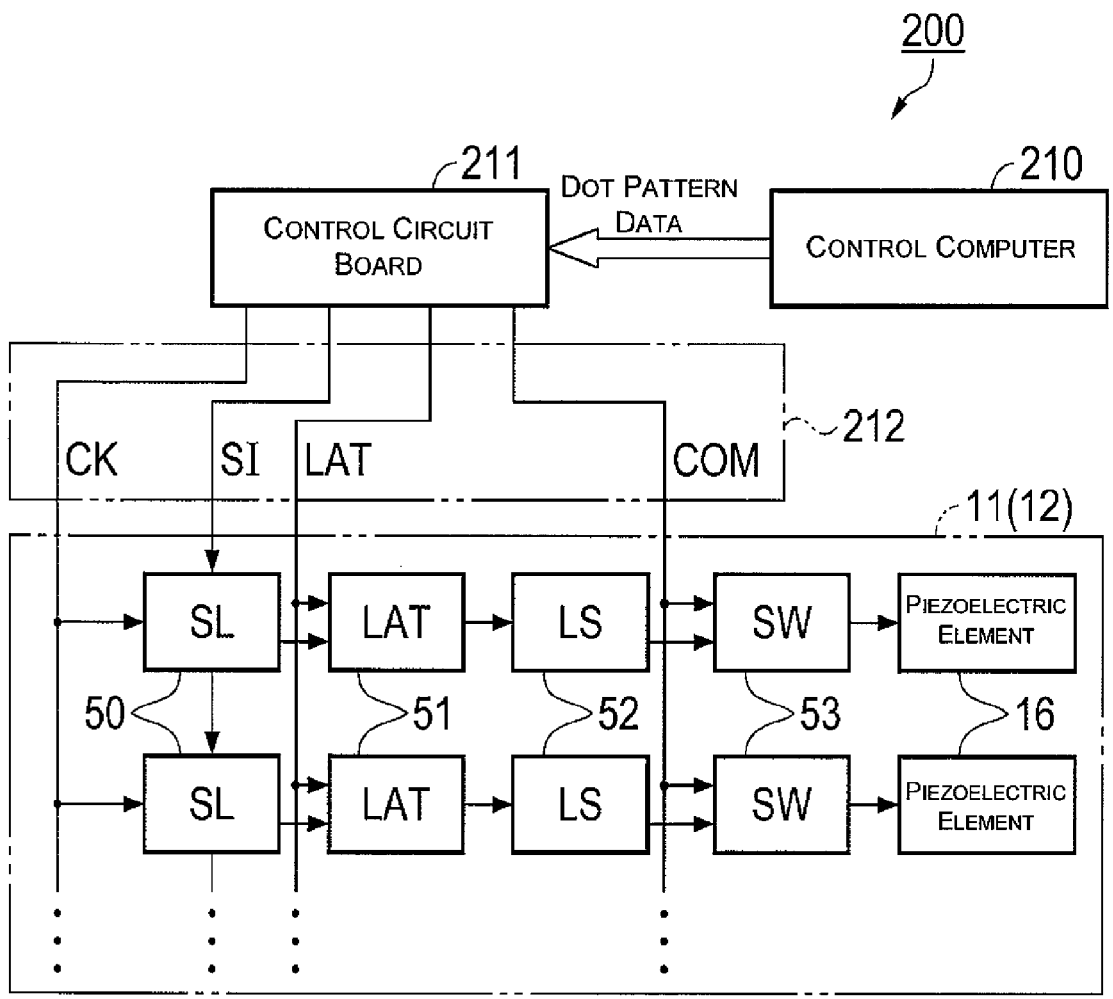
FIG. 5 is a diagram showing the electrical configuration of the liquid material discharge device.

FIG. 5 is a diagram showing the electrical configuration of the liquid material discharge device. FIG. 6 is a diagram showing the relationship between the dot pattern and the arrangement of the nozzles.

In FIG. 5, the liquid material discharge device 200 is provided with a control computer 210 for performing overall control of the entire device, and a control circuit board for performing electrical drive control of the heads 11, 12. The control circuit board 211 is electrically connected with the heads 11, 12 via a flexible cable 212. The heads 11, 12 are also provided with a shift register (SL) 50, a latch circuit (LAT) 51, a level shifter (LS) 52, and a switch (SW) 53 that correspond to a piezoelectric element 16 that is provided to each nozzle 20 (see FIG. 2).

Discharge control in the liquid material discharge device 200 is performed in the following manner. Specifically, the control computer 210 first transfers dot pattern data (specifically described hereinafter) in which an arrangement pattern of the liquid material on the substrate P (see FIG. 1) is digitized to the control circuit board 211. The control circuit board 211 then decodes the dot pattern data to generate nozzle data as ON/OFF (discharge/no discharge) information for each nozzle 20. The nozzle data are converted to serial signals (SI), synchronized with a clock signal (CK), and transferred to the shift registers 50.

The nozzle data transferred to the shift registers 50 are latched at the timing at which the latch signals (LAT) are inputted to the latch circuits 51, and the nozzle data are converted by the level registers 52 to gate signals used for the switches 53. Specifically, when the nozzle data indicate "ON," the switches 53 open and drive signals (COM) are fed to the piezoelectric elements 16, and when the nozzle data indicate "OFF," the switches 53 are closed, and the drive signals (COM) are not fed to the piezoelectric elements 16. The liquid material is converted to droplets and discharged from nozzles 20 that correspond to "ON," and the discharged liquid material is arranged on the substrate P.

As described above, discharge of the liquid material is controlled based on the dot pattern (data). This dot pattern can be indicated as a pattern in which dots D are arranged in zones that are the discharge (arrangement) positions of the liquid material in a matrix MT that has a primary scanning direction component and a secondary scanning direction component, as shown in FIG. 6. A dot D may indicate not only the mere presence of a discharge, but also a tone. For example, the discharged amount or the discharge timing of the liquid material may be varied according to the tone. The pitch:p1 of the primary scanning direction of the matrix MT herein is determined by the scanning speed and the discharge control period of the liquid material. The pitch:p2 of the secondary scanning direction of the matrix MT can be set to a whole multiple of the integer part of the pitch:p0 of the scanning trajectory of the nozzles 20 in a single scan. In the present embodiment, p2 is set to one third of p0, and the nozzles 20 are brought into the corresponding positions of all the dots D in the matrix MT to arrange the liquid material by offsetting the positions of the nozzles 20 from each other in the secondary scanning direction every third scan.

The dots d1, d2, d3 adjacent to each other in the diagram are from the first scan, the second scan, and the third scan, respectively. These dots can all be correlated to the same nozzle, but the head is preferably moved a large amount in the secondary scanning direction during the scan so that the dots each correspond to a different nozzle 20 in order to spatially disperse the variation in characteristics (discharged amount, for example) between nozzles. There are various methods of offsetting the positions of the nozzles 20 (head) between a plurality of scans, and an appropriate method may be employed with consideration for the cycle time or the dispersion of characteristic variations between nozzles or heads. Although not employed in the present embodiment, a method in which the positions of the nozzles 20 in the secondary scanning direction are superposed in a plurality of scans enables a dot D in a single row (along the primary scanning direction) to be allocated to a plurality of nozzles 20.

Color Filter Manufacturing Method (Liquid Material Arrangement Method)

The method for manufacturing a color filter (method for arranging a liquid material) according to the present invention will next be described with reference to FIGS. 7 through 9.

Figure 7:
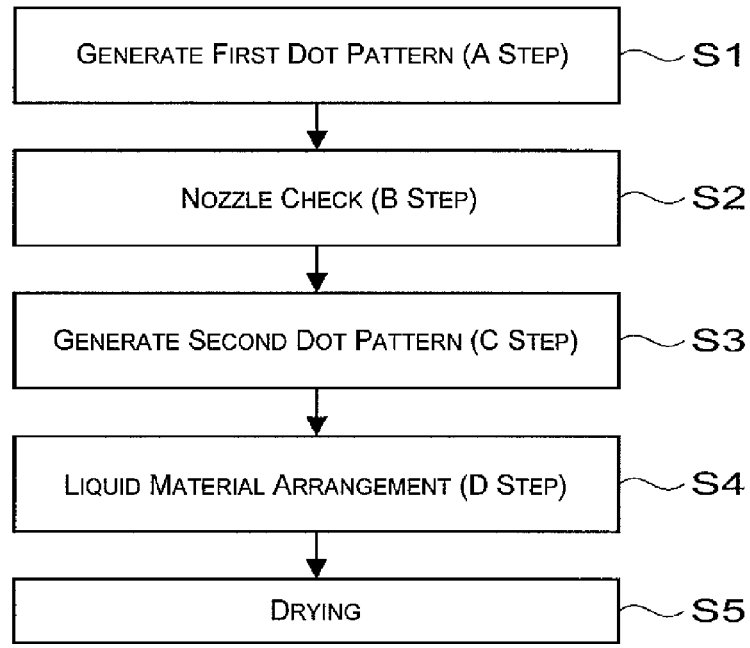
FIG. 7 is a flowchart showing the steps for forming the colored parts in the color filter.
Figure 8:
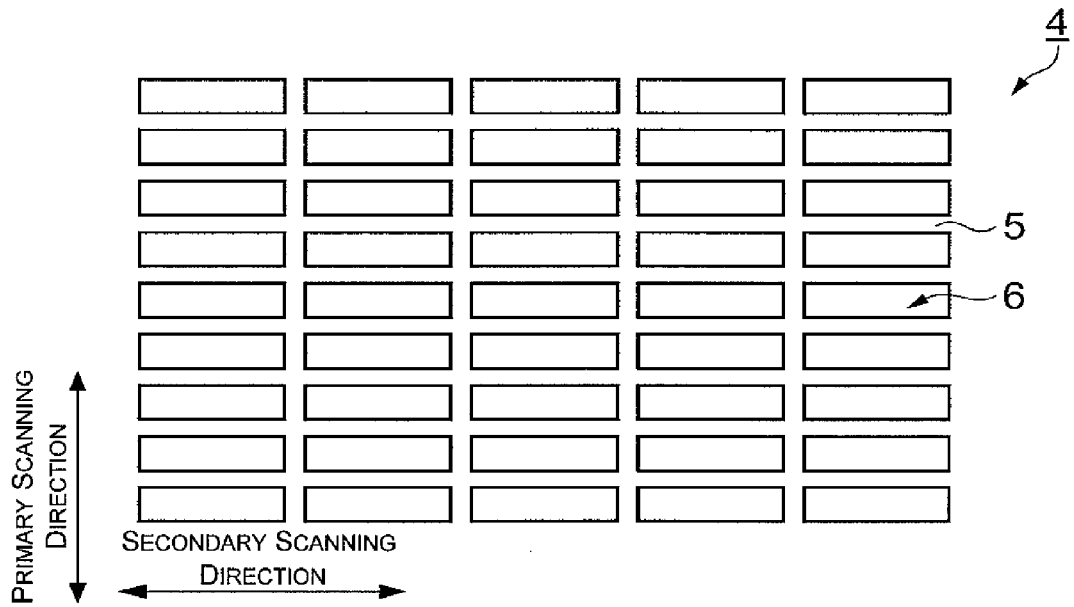
FIG. 8 is a plan view showing the state of the substrate when the liquid material is arranged.

FIG. 7 is a flow chart showing the steps for forming the colored parts in the color filter. FIG. 8 is a plan view showing the state of the substrate when the liquid material is arranged. FIG. 9 is a diagram showing the first dot pattern.

The colored parts 2 (see FIGS. 1 and 2) of the color filter 1 (see FIGS. 1 and 2) are formed by preparing a liquid material that includes color material corresponding to R, G, and B and arranging the color material on the substrate using the liquid material discharge device 200 (see FIG. 3). As shown in FIG. 8, banks 5 are formed in advance in the substrate 4 on which the liquid material will be arranged, and the substrate 4 is mounted on the stage 205 (see FIG. 3) in the present embodiment with the long direction of the partitioned regions 6 in the secondary scanning direction and the short direction of the partitioned regions 6 in the primary scanning direction.

The liquid material is arranged in the partitioned regions 6 as prescribed regions that are partitioned by the banks 5, but a lyophilizing treatment on the exposed surface of the substrate 4 in the partitioned regions 6, and a water-repellant treatment on the surfaces of the banks 5 are preferably performed in advance so that the liquid material is properly patterned according to the partitioned regions 6. Such treatments can be performed by plasma treatment with oxygen or a fluorocarbon, for example. The formation of the banks 5 is a preferred embodiment for creating a highly precise pattern of the liquid material, but such physical partitions are not necessarily needed in order to define the partitioned regions.

The first dot pattern is first created prior to arrangement of the liquid material (A step S1 (first pattern generating step) of FIG. 7). The first dot pattern is the basis for generating a dot pattern (second dot pattern) for discharge control, and has a configuration such as the one shown in FIG. 9. In the diagram, the empty circles each represent a dot, the imaginary partitioned region A indicates a region corresponding to the partitioned regions 6 when the matrix MT is superposed on the substrate 4, and the imaginary boundary B indicates the boundary of the imaginary partitioned region A. The reference symbols L1 through L9 and R1 through R9 in the diagram are used for convenience to indicate the lines and rows of the matrix MT.

In the liquid material device of the present embodiment, a plurality of nozzles is allocated among three scans for the sections of each row of the matrix. In the example shown in the drawing, the dots of rows R1, R4, and R7 correspond to nozzles n11, n12, and n13, respectively, of the first scan; the dots of rows X, R5, and R8 correspond to nozzles n21, n22, and n23, respectively, of the second scan; and the dots of rows R3, R6, and R9 correspond to nozzles n31, n32, and n33, respectively, of the third scan. Nozzles n11 through n33 are each different nozzles.

In the first dot pattern, 30 (prescribed number a) dots are set in an arrangement of 5 lines×6 rows in accordance with a single imaginary partitioned region A. The liquid material (droplets) discharged for each dot actually has a larger diameter than the dots shown in the drawing. Therefore, even when the liquid material (droplets) are ideally arranged according to the dots in the imaginary partitioned region A, there is a risk of the discharged liquid material occurring outside the partitioned region 6 for the dots in line L8 near the imaginary boundary B, for example. When the liquid material is discharged for all 30 of the dots, the total amount thereof exceeds the capacity of the partitioned region 6, and overflow occurs. Since numerous inappropriate dots are also included in the actual arrangement of the liquid material in the first dot pattern, this dot pattern cannot be used as such for discharge control, and must be converted to the second dot pattern.

A detailed description will be given hereinafter, but a routine for determining prohibited dots based on the discharge information of the nozzles is needed in order to generate the second dot pattern. A nozzle check for acquiring the discharge information of the nozzles is therefore performed before the second dot pattern is generated (B step S2 (discharge information acquiring step) of FIG. 7). The nozzle discharge information herein includes information relating to the presence of significant discharge anomalies, and to the precision of the arrangement position (landing position) of the liquid material. Examples of discharge anomalies include inability to discharge, severe over-discharge, defects in droplet formation such as misting and the like, and other phenomena.

The nozzle check in the present embodiment is performed by discharging droplets from a nozzle to a paper, capturing an image of the landing mark on the paper, and analyzing the image. Specifically, the size (area) and shape of the landing mark are acquired as information for determining the presence of a discharge anomaly, and the deviance from the ideal position of the landing mark is acquired as the accuracy of the arrangement position. A primary scanning direction component: Δ1 and a secondary scanning direction component: Δ2 are acquired with regard to the arrangement position accuracy.

When the nozzle check (step S2) is completed, the first dot pattern is processed based on the acquired nozzle discharge information, and the second dot pattern for discharge control is generated (C step S3 (dot deleting step) of FIG. 7). This processing is performed for each unit of 30 dots set for each imaginary partitioned region A, whereby 18 (prescribed number b (second prescribed number)) dots are deleted from the 30 (prescribed number a (first prescribed number)) dots, and a second dot pattern having 12 dots is generated (see FIG. 14, for example).

When the second dot pattern is generated, the liquid material is arranged in the partitioned regions 6 based on the second dot pattern (D step S4 (liquid material arranging step) of FIG. 7), the arranged liquid material is dried, and the colored parts 2 (see FIGS. 1 and 2) are formed (step S5 of FIG. 7). A detailed description will be given hereinafter, but the second dot pattern is made suitable based on the nozzle discharge information, and the colored parts 2 corresponding to the partitioned regions 6 are formed with satisfactory precision.

In step S4, an amount of the liquid material corresponding to 12 dots (droplets) is arranged in the partitioned regions 6. The arranged amount of the liquid material is a critical factor in determining the color of the colored parts 2, and must therefore be kept strictly constant. In the present embodiment, the arranged amount of the liquid material is indirectly kept constant by regulating the total number (prescribed number b) of dots deleted in step S3.

The nozzle check (step S2) and the generation of the second dot pattern (step S3) performed based on the results of the nozzle check are preferably performed periodically when the substrate 4 as a unit is replaced. The discharge information of the nozzles may also change according to acquired circumstances, e.g., contamination of the flow channels with air, the nozzle maintenance history, and other circumstances, and the discharge information is used to rapidly adapt to such changes.

Generation of Second Dot Pattern

Generation of the second dot pattern will next be described in detail with reference to FIGS. 9 through 14.

Figure 10:
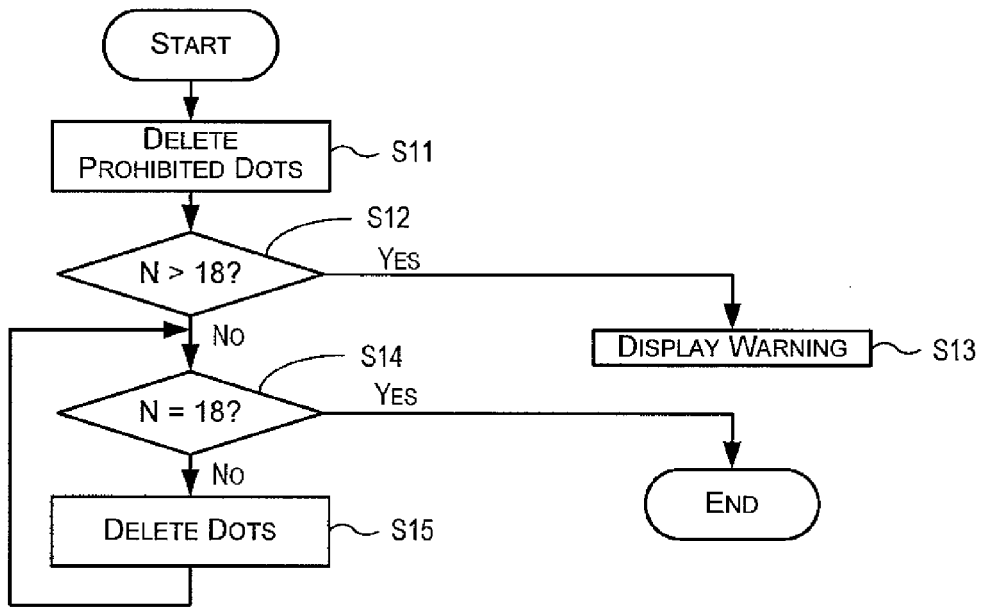
FIG. 10 is a flowchart showing the routines for generating the second dot pattern.
Figure 13A:
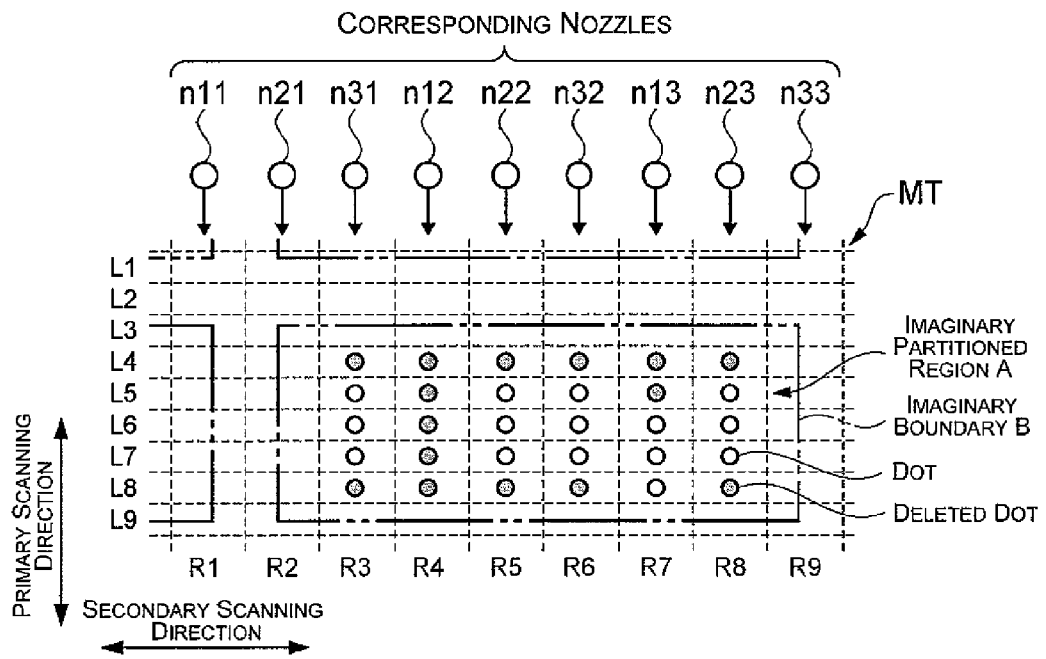
FIGS. 13A and 13B are diagrams showing examples of the process for generating the second dot pattern.
Figure 13B:
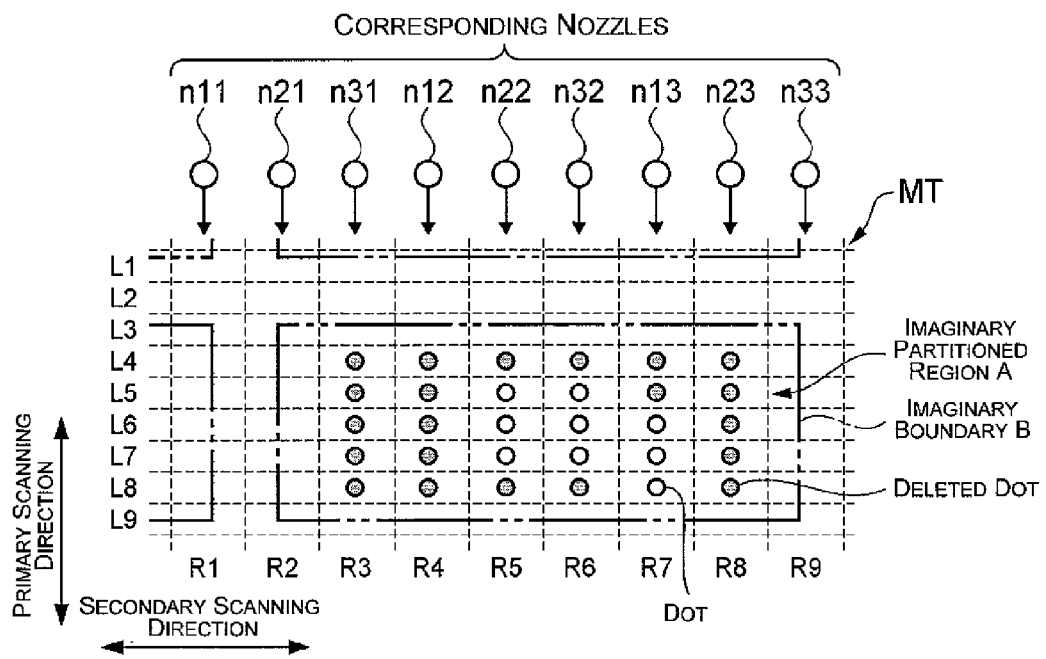
Figure 14:
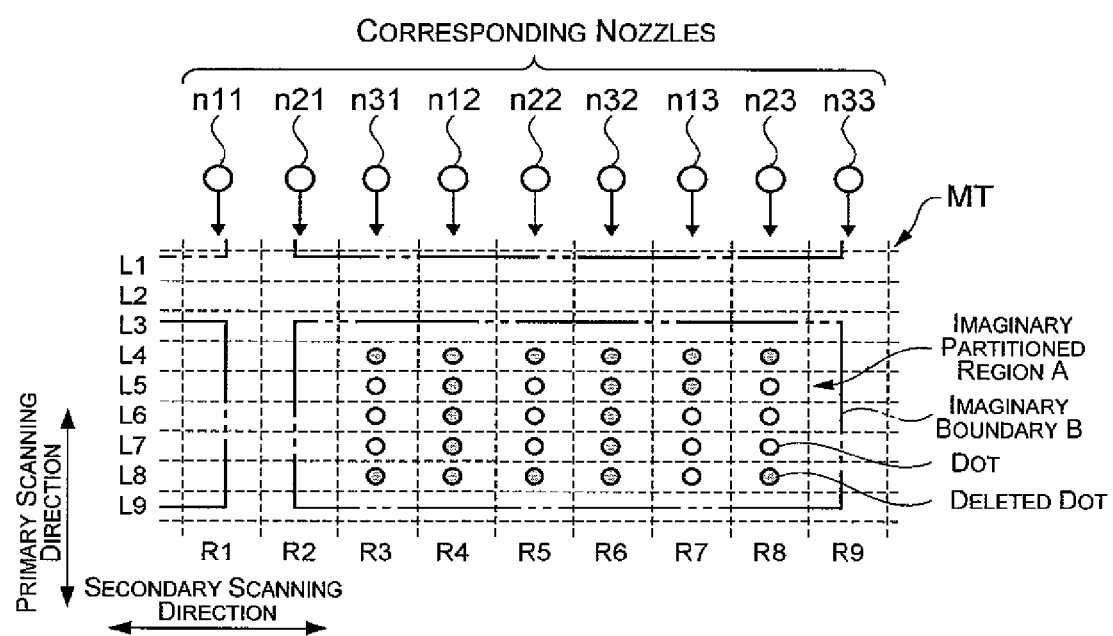
FIG. 14 is a diagram showing an example of the generated second dot pattern.

FIG. 10 is a flowchart showing the routines for generating the second dot pattern. FIG. 11 is a diagram showing the conditions for determining prohibited dots. FIG. 12 is a diagram showing the conditions for selecting deleted dots. FIGS. 13A and 13B are diagrams showing examples of the process for generating the second dot pattern. FIG. 14 is a diagram showing an example of the generated second dot pattern.

Figure 9:
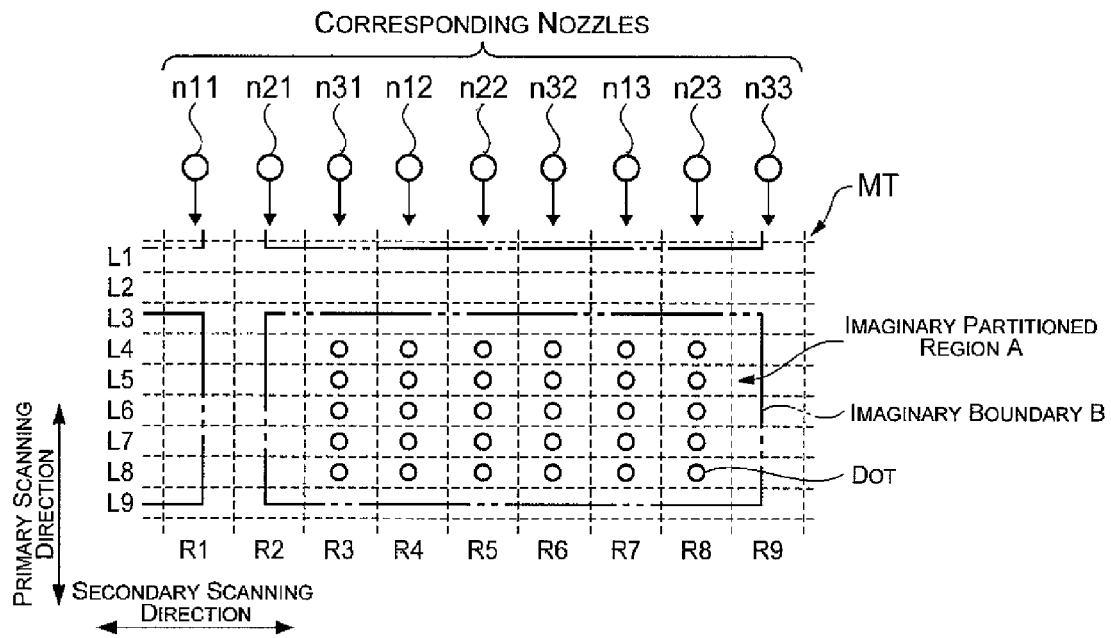
FIG. 9 is a diagram showing the first dot pattern.

The processing for generating the second dot pattern is performed in accordance with the flowchart of FIG. 10 for each 30-dot unit set according to each imaginary partitioned region A based on the first dot pattern shown in FIG. 9. This processing is actually performed automatically using a computer, and the computer reads the first dot pattern inputted in advance and the discharge information of the nozzles, and executes the processing shown in FIG. 10. The details of the processing will be described in relation to a single imaginary partitioned region A in order to avoid complicating the description.

In the first step S11, a determination is made as to whether dots among all 30 of the dots are prohibited dots, and dots that are determined to correspond to prohibited dots are deleted with priority. The term "prohibited dots" used herein refers to dots that are unsuitable due to the risk of defects occurring when the liquid material is discharged to form the dots, and the determination of prohibited dots is performed based on the determination table shown in FIG. 11.

First, dots that correspond to nozzles having discharge anomalies are all determined to be prohibited dots. The reason for this is that the precision of the amount of the liquid material arranged in the partitioned regions 6 decreases when discharge driving is performed based on such dots. For example, in the example shown in FIG. 13A, since nozzle n12 has a discharge anomaly, the dots in row R4 that correspond to nozzle n12 are deleted as prohibited dots (circular marks painted in halftone indicate deleted dots).

First adjacent dots of the (section that includes the) imaginary boundary B on the primary scanning direction side among dots that correspond to nozzles in which the arrangement position precision: $\Delta 1$ in the primary scanning direction is less than a prescribed quantity, and first and second adjacent dots of the imaginary boundary B on the deviation direction side among the dots that correspond to nozzles in which $\Delta 1$ is equal to or greater than the prescribed quantity are determined to be prohibited dots. The reason for this is that when discharge driving is performed based on such dots, there is a risk of the discharged liquid material occurring outside the partitioned regions 6 and mixing with adjacent regions of a different color, or contributing to patterning defects. For example, in the example shown in FIG. 13A, dots that are deleted as prohibited dots include the dots of lines L4 and L8 that correspond to nozzles n31, n22, n32, and n23 having normal arrangement position precision, and the dots of lines L4 and L5 that correspond to nozzle n13 having characteristics whereby the arrangement position is significantly shifted upward.

In the example of the present embodiment, at least two of the five dots that correspond to each nozzle are thus always deleted regardless of the precision of the arrangement positions in the primary scanning direction. This configuration is based on the idea of controlling the arrangement position of the liquid material by setting dots in advance in a wide range that takes variations in the precision of the arrangement positions into account, and deleting unsuitable dots in accordance with the arrangement position precision of the nozzles.

First adjacent dots of the imaginary boundary B on the deviation direction side are determined to be prohibited dots from among the dots that correspond to nozzles in which the arrangement position precision: $\Delta 2$ in the secondary scanning direction is equal to or greater than a prescribed quantity. The reason for this is that when discharge driving is performed based on such dots, there is a risk of the discharged liquid material occurring outside the partitioned regions 6 and contributing to patterning defects. For example, when nozzle n23 has characteristics whereby the arrangement position of the liquid material is significantly shifted to the right, all the dots of row R8 are determined to be prohibited dots. However, unlike the case of a discharge anomaly, since the determination of the prohibited dots is made with consideration for the direction of deviation and the positional relationship between the imaginary boundary B and the corresponding dots, the dots are not determined to be prohibited dots when the deviation is in the opposite direction. Even in such a case as when another check determines that the nozzle n23 is allocated to a section towards the center of another imaginary partitioned region, the corresponding dots are not determined to be prohibited dots.

As is apparent from the above description, regarding errors in the arrangement position precision, rather than merely prohibiting discharge from nozzles that have such errors, the second dot pattern is generated based on the idea of prohibiting the use of dots that have an inappropriate relationship to a partitioned region 6 (imaginary partitioned region A). The nozzles are therefore utilized with superior efficiency in comparison to a method that merely prohibits the use of a nozzle.

When step S11 is completed, a determination is made in the subsequent step S12 as to whether the total number: N of deleted dots is greater than 18. This is because the number N must be regulated to 18 in order to keep constant the amount of the liquid material that is arranged for the partitioned regions 6, and the deletion of more than 18 dots cannot be allowed. For example, FIG. 13B shows an example in which nozzles n31, n12, and n23 have errors, and 24 prohibited dots are therefore deleted in step S11. A warning is thus displayed in step S13 when N is greater than 18 (Yes). Specifically, this warning corresponds to an error message that indicates that the second dot pattern cannot be generated with the prohibited dots deleted.

When N is determined to be 18 or less in step S12 (No), a determination is made in the subsequent step S14 as to whether N has reached 18. When N has not reached 18 (No), more dots are deleted in the subsequent step S15. This is because the number N must be regulated to 18 in order to keep constant the amount of the liquid material that is arranged for the partitioned regions 6, and a state in which N is less than 18 does not allow the second dot pattern to be completed.

After dots are deleted in step S15, a determination is again made in step S14 as to whether N has reached 18. Dots are thereby continuously deleted (step S15) until N reached 18, and when N reaches 18 (Yes), the sequence of processing is completed, and the second dot pattern is completed.

The dots (deleted dots) deleted in step S15 are selected based on the conditions shown in the table of FIG. 12. Specifically, dots relating to the third scan among the remaining dots are first selected with priority (first condition). When there is a plurality of dots selected by the first condition, dots that are farther away from the imaginary boundary B on the secondary scanning direction side are selected from among the plurality of dots (second condition), and when there is a plurality of dots selected by the second condition, dots that are farther away from the imaginary boundary B on the primary scanning direction side are selected from among the plurality of dots (third condition). When there is a plurality of dots selected by the third condition, a single dot is selected at random from among the plurality of dots.

The third scan is the final scan for the partitioned region 6, but in such a final scan, since the liquid material is discharged where a certain amount of the liquid material has already been discharged in a prescribed region from previous scans, the liquid material can easily escape (overflow) from the partitioned region 6. The dots for the third scan were selected with priority as deleted dots in the first condition so that such a problem could be prevented by reducing the amount of the liquid material arranged in the third scan.

The arrangement positions that correspond to the deleted dots are locations in which defects in wetting by the liquid material easily occur in the partitioned region 6. Dots that were farther away from the imaginary boundary B were selected as deleted dots by the second and third conditions so as to provide a relative reduction in the occurrence of defects by setting such locations towards the center of the partitioned region 6. Specifically, since spreading of the arranged liquid material into the periphery of those areas can be anticipated for areas closer to the center of the partitioned region 6, the potential for defects can be considered adequately low without arranging the liquid material.

For example, in the example shown in FIG. 13A in which 15 prohibited dots are deleted in step S11, N is determined in step S14 to be less than 18, and dots are deleted in step S15. At this time, the targets for selection by the first condition are six dots that correspond to nozzle n31 and nozzle n32. Among these dots, three dots that correspond to nozzle n32 are selected by the second condition, and the dots of line L6 are selected by the third condition and deleted (N=16).

Since N is less than 18 (step S14), more dots are deleted (step S15). At this time, the dots of lines L5 and L7 that were not previously selected are selected from among the dots that correspond to nozzle n32 by the first and second conditions, but these dots all correspond to the second adjacent dots of the imaginary boundary B, and therefore cannot be narrowed down to a single selected dot by the third condition. Consequently, the randomly selected dots are deleted (N=17). Deleted dots can also be selected more precisely by comparing the distance between the imaginary boundary B and the dots of lines L5 and L7 as a level of actual distance rather than zone units of the matrix MT.

Since N is less than 18 (step S14), more dots are deleted (step S15). In step S15, the single dot not previously selected from among the dots corresponding to nozzle n32 is selected by the first and second conditions, and this dot is deleted (N=18). Among the 30 dots in the first dot pattern, 18 dots are thus deleted to generate the second dot pattern shown in FIG. 14.

As described above, in the process for generating the second dot pattern, prohibited dots that are determined based on the discharge information of the nozzles are deleted with priority (step S11), and it is therefore possible to appropriately prevent defects relating to the precision of patterning, the amount of the liquid material that is arranged in the partitioned region 6, and other factors. Since the second dot pattern is generated essentially by "selecting" dots for deletion from the plurality (prescribed number a) of dots under given conditions (FIGS. 11 and 12), processing is relatively simple even under complex conditions. The total number (prescribed number b) of deleted dots is specified (steps S12 and S14), whereby the amount of the liquid material arranged with respect to the prescribed region 6 can easily be kept constant.

MODIFICATION EXAMPLE 1

Modification Example 1 will next be described with reference to FIGS. 10, 13A, 15, and 16, with emphasis on the differences between Modification Example 1 and the previously described embodiment.

FIG. 15 is a diagram showing the conditions for selecting deleted dots according to Modification Example 1. FIG. 16 is a diagram showing an example of the second dot pattern according to Modification Example 1.

In Modification Example 1, deleted dots are selected in step S15 based on the conditions shown in FIG. 15. Specifically, dots that correspond to nozzles other than the nozzle that corresponds to the dots already targeted for deletion in step S115 are selected by the first condition. By setting such a condition, since dots corresponding to each of the nozzles are deleted in substantially uniform ratios, the usage frequency of the nozzles with respect to a single partitioned region 6 is appropriately distributed. This configuration makes it possible to prevent fluctuation in the amount of the liquid material among partitioned regions 6 that is caused by fluctuation in the discharged amount between nozzles.

For example, in the example of FIG. 13A in which 15 prohibited dots are deleted in step S11, the three dots that are deleted in step S15 each correspond to different nozzles. Since the second condition and the third condition are the same as in the embodiment, dots that are distant from the imaginary boundary B are deleted with first priority, and the second dot pattern shown in FIG. 16 is generated as a result.

MODIFICATION EXAMPLE 2

Modification Example 2 will next be described with reference to FIGS. 10, 13A, 17, and 18, with emphasis on the differences between Modification Example 2 and the previously described embodiment.

FIG. 17 is a diagram showing the conditions for selecting deleted dots according to Modification Example 2. FIG. 18 is a diagram showing an example of the second dot pattern according to Modification Example 2.

In Modification Example 2, deleted dots are selected in step S15 based on the conditions shown in FIG. 17. Specifically, dots that correspond to nozzles other than the nozzle that corresponds to the dots already targeted for deletion in step S15 are selected by the first condition, and dots of the third scan are selected by the second condition. By setting such conditions, dots corresponding to each of the nozzles are deleted in substantially uniform ratios, the usage frequency of the nozzles is appropriately distributed, the amount of the liquid material arranged in the final scan is reduced, and overflow can be prevented.

In contrast to the previously described embodiment, dots that are closer to the imaginary boundary B are selected with priority by the third and fourth conditions. When such conditions are set, the liquid material is no longer arranged with priority in positions near the boundary of the partitioned region 6, and the liquid material can therefore be appropriately prevented from occurring outside the partitioned region 6.

For example, in the example of FIG. 13A in which 15 prohibited dots are deleted in step S11, the three dots that are deleted in step S15 each correspond to different nozzles. The dots that correspond to nozzles n31 and n32 of the third scan, and dots that are close to the imaginary boundary B are deleted with priority, and the second dot pattern shown in FIG. 18 is generated as a result.

Second Embodiment

Referring now to FIGS. 19 to 22, a liquid material arrangement method in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Figure 19:
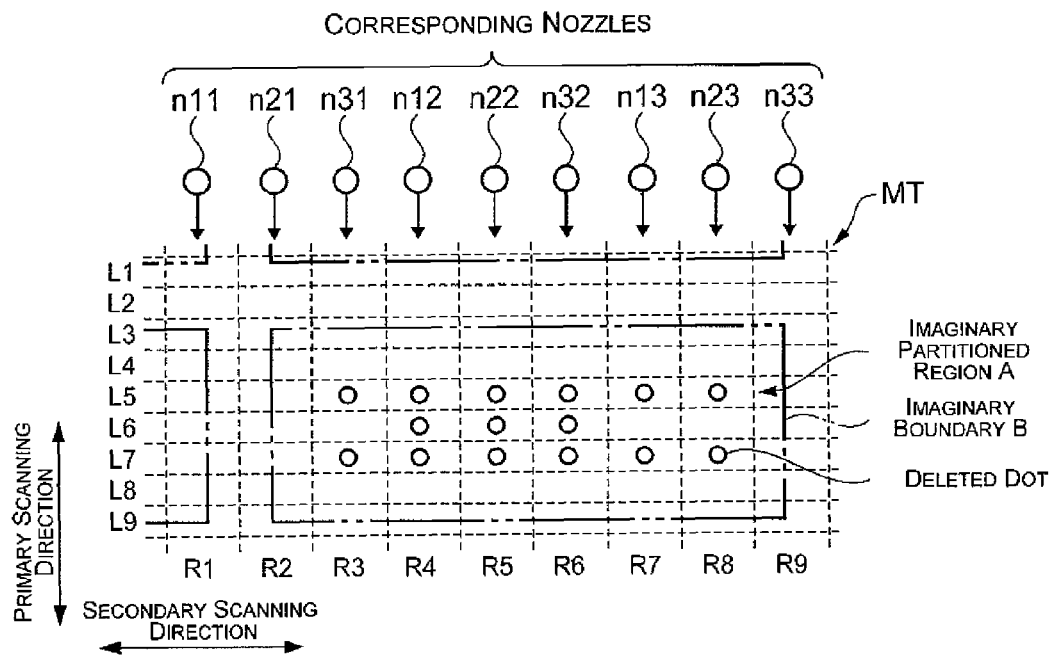
FIG. 19 is a diagram showing the first dot pattern.
Figure 20:
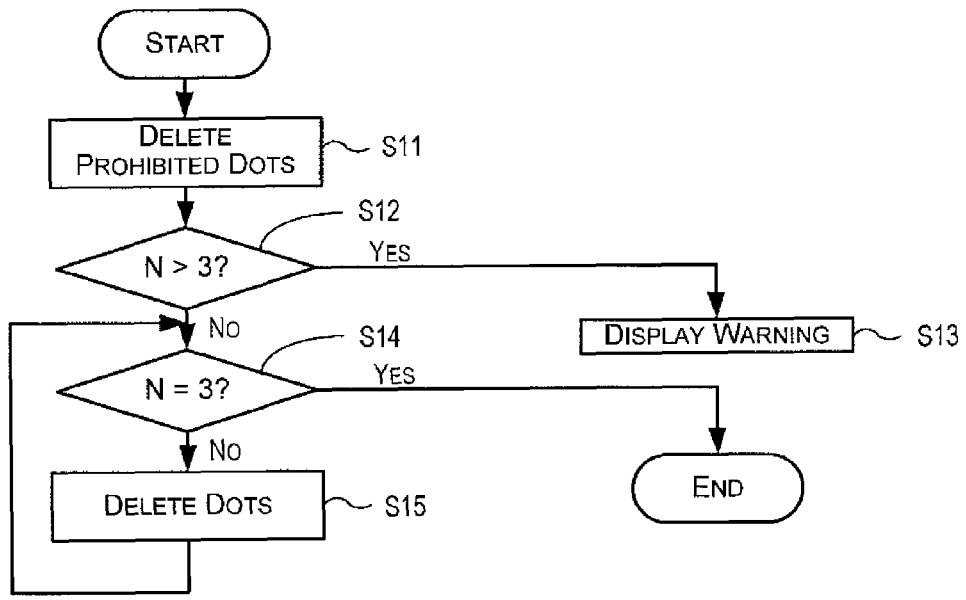
FIG. 20 is a flowchart showing the routines for generating the second dot pattern.
Figure 21A:
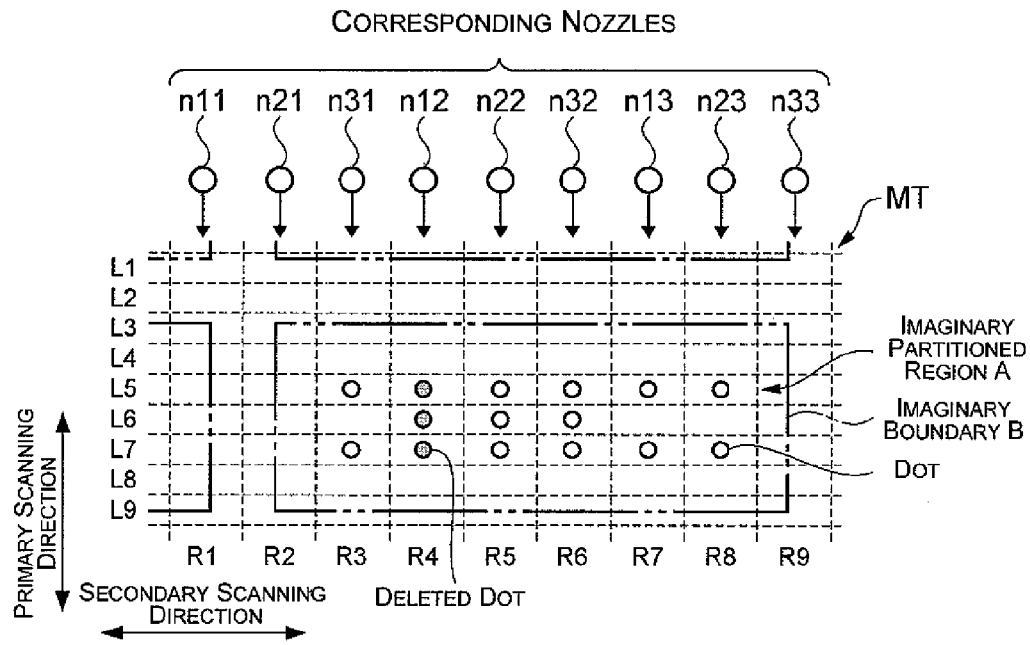
FIGS. 21A and 21B are diagrams showing examples of the second dot pattern.
Figure 21B:
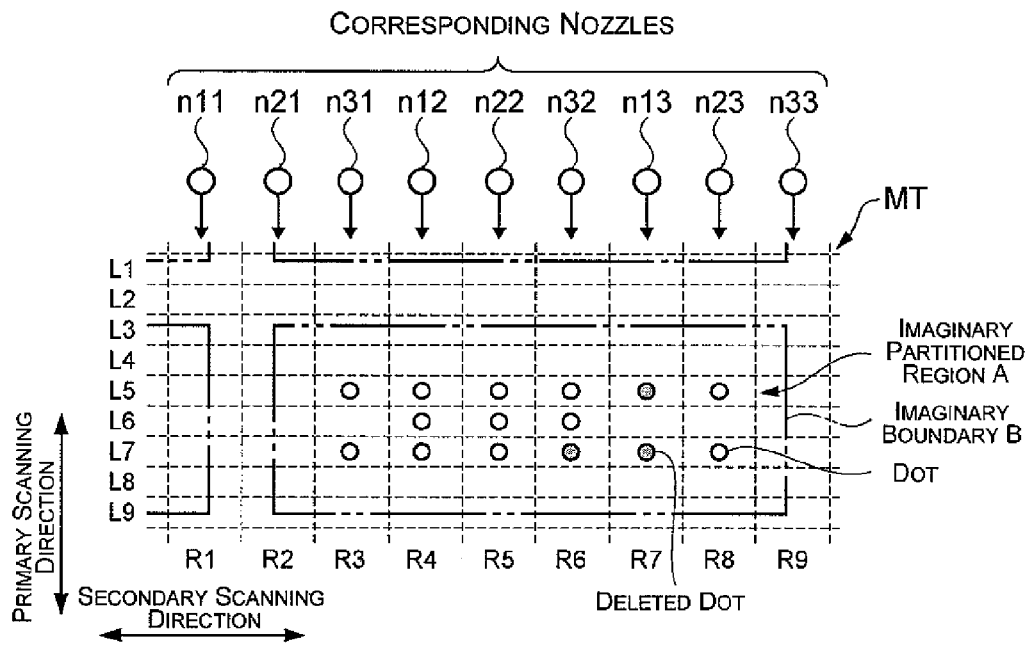

FIG. 19 is a diagram showing the first dot pattern. FIG. 20 is a flowchart showing the routines for generating the second dot pattern. FIGS. 21A and 21B are diagrams showing an example of the second dot pattern.

In the first dot pattern in the second embodiment, 15 (prescribed number a (first prescribed number)) dots are set for each imaginary partitioned region A, as shown in FIG. 19. In step S11 of FIG. 20, only dots that correspond to nozzles that have a discharge anomaly are deleted as prohibited dots, and the precision of the arrangement position of the liquid material is not taken into account. In steps S12 and S14, a determination is made based on a value of 3 (prescribed number b (second prescribed number)) for the total number of deleted dots so that the number of dots remaining in the second dot pattern is the proper number of 12.

For example, in step S11, when the dots or row R4 corresponding to the abnormally discharging nozzle n12 are deleted as prohibited dots (N=3), a determination of "No" is then made in step S12, a determination of "Yes" is made in step S14, and the second dot pattern shown in FIG. 21A is generated.

In step S11, when the dots or row R7 corresponding to the abnormally discharging nozzle n13 are deleted as prohibited dots (N=2), a determination of "No" is then made in step S12, a determination of "No" is made in step S14, and one dot is deleted in step S15. In this instance, when deleted dots are selected based on the conditions shown in the table of FIG. 17, for example, the dots of line L7 among the dots that correspond to nozzle n32 of the third scan are deleted, and the second dot pattern shown in FIG. 21B is generated as a result.

According to the second embodiment, there may be various arrangements or numbers (prescribed number a) of dots set for each imaginary partitioned region A in the first dot pattern. For example, the first dot pattern may have a configuration in which dots are arranged in a zone that includes the imaginary boundary B or that is outside the imaginary boundary B.

In setting the number and arrangement of dots in the first dot pattern, provision must be made so that at least the proper number (12 in the present embodiment) of dots remain regardless of which nozzle has a discharge anomaly. For example, a setting in which dots are set so as to be concentrated in a certain row is inappropriate, because the number of remaining dots would be less than the proper number in a case in which the nozzle that corresponds to the aforementioned row develops a discharge anomaly.

Figure 22:
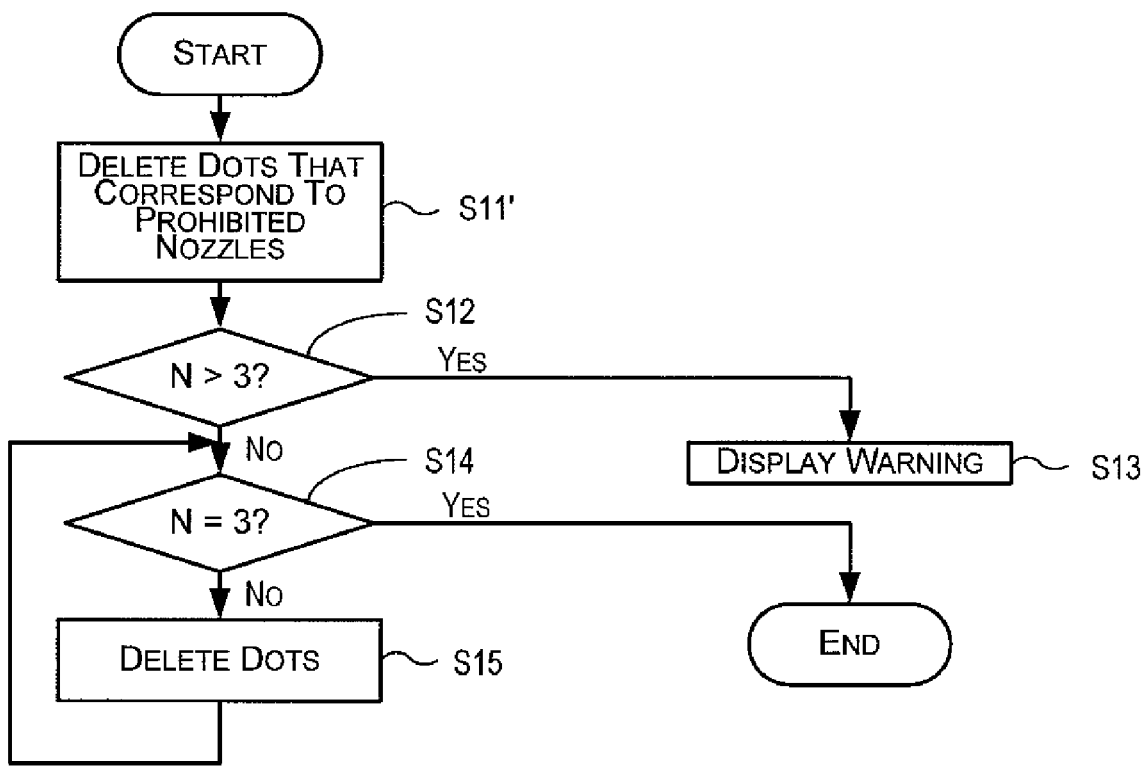
FIG. 22 is a flowchart showing the routines for generating the second dot pattern according to a modification example.

FIG. 22 is a flowchart showing the routines for generating the second dot pattern according to a modification example. In this modification example, prohibited nozzles whose use is to be prohibited are specified (listed) in advance (E step (prohibited nozzle specifying step) of the present invention) before the second dot pattern is generated. In step S11', the dots that correspond to the specified prohibited nozzles are deleted with priority. According to this modification example, the nozzle usage conditions are changed, and the liquid material is arranged without regard for the discharge information of the nozzles.

Figure 23:
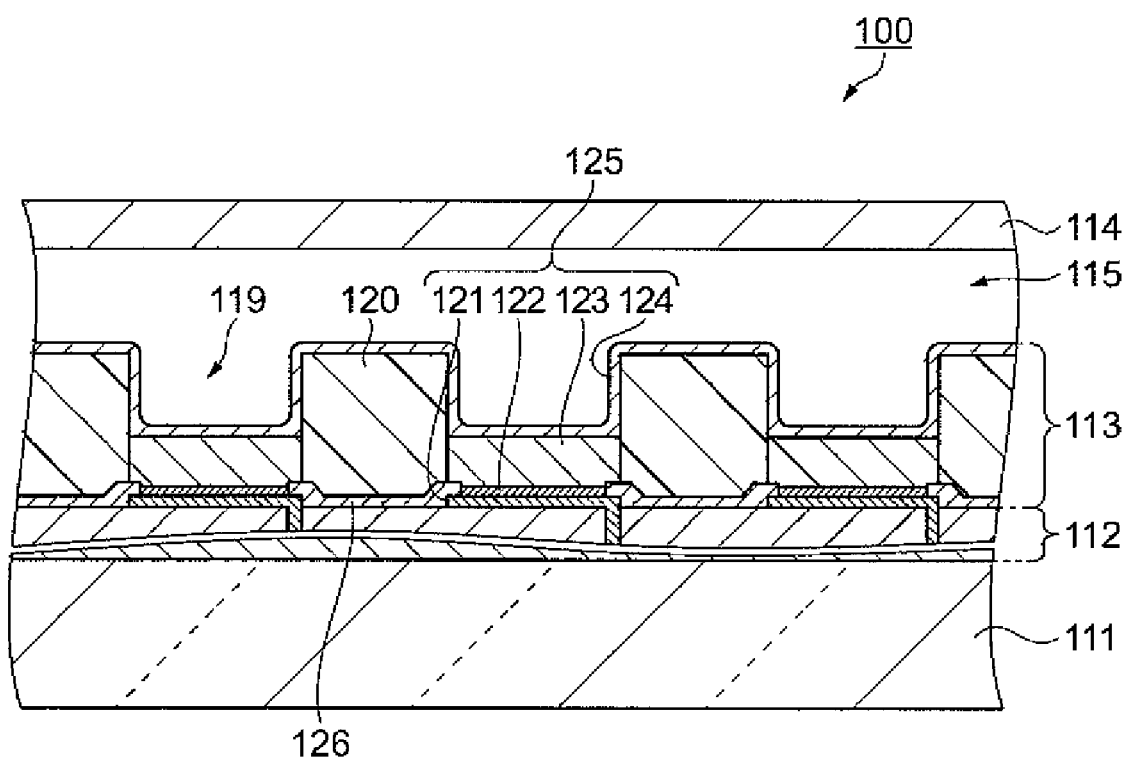
FIG. 23 is a sectional view showing the relevant parts of the structure of the organic EL display device.

The liquid material arrangement method illustrated in the previous embodiments can be applied to a method for manufacturing an organic EL display device as shown in, for example, FIG. 23. FIG. 23 is a sectional view showing the relevant parts of the structure of the organic EL display device.

As shown in FIG. 23, the organic EL display device 100 is provided with an element substrate 111, a drive circuit part 112 formed on the element substrate 111, a luminescent element part 113 formed on the drive circuit part 112, and a sealing substrate 114 for sealing the drive circuit part 112 and the luminescent element part 113. The sealed space 115 that is sealed by the sealing substrate 114 is filled with an inert gas.

The luminescent element part 113 has a plurality of partitioned regions 119 that is partitioned by banks 120, and luminescent elements 125 are formed in the partitioned regions 119. In the luminescent elements 125, a positive hole transport layer 122 and an organic EL material layer 123 are layered between a shared electrode (cathode) 124 and a segment electrode (anode) 121, which is the output terminal of the drive circuit part 112. A light-blocking film 126 for preventing interference between contrast elements is formed from chromium, an oxide thereof, or the like between the banks 120 and the drive circuit part 112.

The positive hole transport layer 122 is a functional layer for introducing a positive hole into the organic EL material layer 123, and is formed using a doped polythiophene derivative (PEDOT) or other polymer derivative. The organic EL material layer 123 is formed using a publicly known organic EL material that is capable of fluorescence or phosphorescence, e.g., a polyfluorene derivative, a (poly)paraphenylene vinylene derivative, a polyphenylene derivative, or the like. The positive hole transport layer 122 and the organic EL material layer 123 are manufactured by using the liquid material arrangement method described in the first embodiment to arrange a liquid material that includes the corresponding functional material (PEDOT/organic EL material) in the partitioned regions 119 as the prescribed regions.

The present invention is not limited by the embodiments described above. For example, in step S15, randomly selected dots may be deleted instead of providing such priority conditions (FIG. 12, FIG. 15, and others) as were described in the embodiments.

Other examples in which the abovementioned liquid material arrangement method is used include the formation of a fluorescent film in a plasma display device, the formation of conduction wiring or resistance elements in an electrical circuit, and other examples.

The configurations described in the embodiments may also be appropriately combined, omitted, or combined with other configurations not shown in the drawings.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. The reduction of the vertical and horizontal scale of members and components is sometimes shown differently than the actual scale for convenience in the drawings referenced in the description above.

What is claimed is:

1. A liquid material arrangement method for arranging a prescribed quantity of liquid material in each of a plurality of units of a prescribed region on a substrate, the liquid material arrangement method comprising:

performing a first pattern generating step for generating a first dot pattern in which a first prescribed number of dots is set according to each of the units of the prescribed region on the substrate, the first prescribed number corresponding to a quantity of liquid material that is larger than the prescribed quantity of liquid material;

performing a discharge information acquiring step for acquiring discharge information of each of a plurality of nozzles corresponding to the first prescribed number of dots in each of the units of the prescribed region, the discharge information including a presence of discharge anomaly in each of the nozzles and an accuracy of an arrangement position of the liquid material discharged from each of the nozzles;

performing a dot deleting step for deleting a second prescribed number of dots including at least one prohibited dot with priority from the first prescribed number of dots to generate a second dot pattern respectively for each of the units of the prescribed region on the substrate, the second prescribed number being set such that a number of dots remaining in the second dot pattern corresponds to the prescribed quantity of liquid material with the first prescribed number and the second prescribed number being constant for each of the units of the prescribed region, the prohibited dot being determined based on the discharge information of each of the nozzles determined in advance; and performing a liquid material arranging step for arranging the liquid material in each of the units of the prescribed region on the substrate by causing the nozzles and the substrate to scan in relative manner and discharging the liquid material from the nozzles based on the second dot pattern.

2. The liquid material arrangement method according to claim 1, wherein
the prescribed region on the substrate is partitioned by a bank.

3. The liquid material arrangement method according to claim 1, wherein
the performing of the dot deleting step includes deleting at least a dot that corresponds to an arrangement position in which there is risk of the liquid material overflowing outside of the prescribed region with priority as the prohibited dot.

4. The liquid material arrangement method according to claim 1, wherein
the performing of the liquid material arranging step includes arranging the liquid material in the prescribed region on the substrate by causing the nozzles and the substrate to scan in relative manner, and
the performing of the dot deleting step includes deleting at least a dot that corresponds to one of the nozzles with the discharge anomaly with priority as the prohibited dot.

5. The liquid material arrangement method according to claim 1, wherein
the performing of the liquid material arranging step includes performing a plurality of scans with respect to the prescribed region to arrange the liquid material in the prescribed region, and
the performing of the dot deleting step includes deleting at least a dot that corresponds to the liquid material to be discharged in a final scan of the plurality of scans with priority when the prohibited dot is not included in the first prescribed number of dots or when a number of the prohibited dot included in the first prescribed number of dots is less than the second prescribed number.

6. The liquid material arrangement method according to claim 1, wherein
the performing of the liquid material arranging step includes arranging the liquid material in the prescribed region on the substrate by causing the nozzles and the substrate to scan in relative manner, and
the performing of the dot deleting step includes deleting at least one dot so that dots corresponding to each of the plurality of nozzles remain in substantially equal ratios when the prohibited dot is not included in the first prescribed number of dots or when a number of the prohibited dot included in the first prescribed number of dots is less than the second prescribed number.

7. The liquid material arrangement method according to claim 1, wherein
the performing of the dot deleting step includes deleting at least a dot that corresponds to an arrangement position that is closer to a boundary of the prescribed region on the substrate with priority when the prohibited dot is not included in the first prescribed number of dots or when a number of the prohibited dot included in the first prescribed number of dots is less than the second prescribed number.

8. The liquid material arrangement method according to claim 1, wherein
the performing of the dot deleting step includes deleting at least a dot that corresponds to an arrangement position that is farther away from a boundary of the prescribed region on the substrate with priority when the prohibited dot is not included in the first prescribed number of dots or when a number of the prohibited dot included in the first prescribed number of dots is less than the second prescribed number.

9. A liquid material arrangement method for arranging a prescribed quantity of liquid material in each of a plurality of units of a prescribed region on a substrate, the liquid material arrangement method comprising:
performing a first pattern generating step for generating a first dot pattern in which a first prescribed number of dots is set according to each of the units of the prescribed region on the substrate, the first prescribed number corresponding to a quantity of liquid material that is larger than the prescribed quantity of liquid material;
performing a prohibited nozzle specifying step for specifying at least one prohibited nozzle whose use is prohibited among a plurality of nozzles, the prohibited nozzle being a nozzle with a discharge anomaly;
performing a dot deleting step for deleting a second prescribed number of dots including at least one dot corresponding to the prohibited nozzle from the first prescribed number of dots to generate a second dot pattern respectively for each of the units of the prescribed region on the substrate, the second prescribed number being set such that a number of dots remaining in the second dot pattern corresponds to the prescribed quantity of liquid material with the first prescribed number and the second prescribed number being constant for each of the units of the prescribed region; and
performing a liquid material arranging step for arranging the liquid material in each of the units of the prescribed region on the substrate by causing the nozzles and the substrate to scan in relative manner and discharging the liquid material from the nozzles based on the second dot pattern.

10. The liquid material arrangement method according to claim 9, further comprising:
performing a discharge information acquiring step for acquiring the discharge information of the nozzles that corresponds to at least the first prescribed number of dots,
the discharge information acquiring step and the dot deleting step being performed with respect to one unit or each of the units of the prescribed region on the substrate.

11. The liquid material arrangement method according to claim 9, wherein
the prescribed region on the substrate is partitioned by a bank.

12. The liquid material arrangement method according to claim 9, wherein
the performing of the discharge information acquiring step includes further acquiring an accuracy of an arrangement position of the liquid material discharged from the nozzles, and
the performing of the dot deleting step includes deleting at least a dot that corresponds to an arrangement position in which there is risk of the liquid material overflowing outside of the prescribed region with priority as the prohibited dot.

13. The liquid material arrangement method according to claim 9, wherein
the performing of the dot deleting step includes deleting at least a dot that corresponds to one of the nozzles with the discharge anomaly with priority as the prohibited dot.

14. The liquid material arrangement method according to claim 9, wherein
the performing of the liquid material arranging step includes performing a plurality of scans with respect to the prescribed region to arrange the liquid material in the prescribed region, and
the performing of the dot deleting step includes deleting at least a dot that corresponds to the liquid material to be discharged in a final scan of the plurality of scans with priority when the prohibited dot is not included in the first prescribed number of dots or when a number of the prohibited dot included in the first prescribed number of dots is less than the second prescribed number.

15. The liquid material arrangement method according to claim 9, wherein
the performing of the dot deleting step includes deleting at least one dot so that dots corresponding to each of the plurality of nozzles remain in substantially equal ratios when the prohibited dot is not included in the first prescribed number of dots or when a number of the prohibited dot included in the first prescribed number of dots is less than the second prescribed number.

16. The liquid material arrangement method according to claim 9, wherein
the performing of the dot deleting step includes deleting at least a dot that corresponds to an arrangement position that is closer to a boundary of the prescribed region on the substrate with priority when the prohibited dot is not included in the first prescribed number of dots or when a number of the prohibited dot included in the first prescribed number of dots is less than the second prescribed number.

17. The liquid material arrangement method according to claim 9, wherein
the performing of the dot deleting step includes deleting at least a dot that corresponds to an arrangement position that is farther away from a boundary of the prescribed region on the substrate with priority when the prohibited dot is not included in the first prescribed number of dots or when a number of the prohibited dot included in the first prescribed number of dots is less than the second prescribed number.

18. A color filter manufacturing method comprising:
performing the liquid material arrangement method according to claim 1 to discharge a plurality of color materials as the liquid material onto a plurality of the prescribed regions on the substrate, respectively; and
curing the arranged liquid material to form a plurality of colored parts in the prescribed regions with each of the colored parts corresponding to a pixel region.

19. An organic EL display device manufacturing method comprising:
performing the liquid material arrangement method according to claim 1 to discharge an organic EL material as the liquid material onto a plurality of the prescribed regions of the substrate, respectively; and
curing the arranged liquid material to form luminescent elements in the prescribed regions with each of the luminescent elements corresponding to a pixel region.

* * * * *